April 6, 1937. J. KARMAZIN Re. 20,321

METHOD OF MAKING HEAT RADIATORS

Original Filed May 31, 1929 2 Sheets-Sheet 1

INVENTOR
JOHN KARMAZIN
BY
Hammond & Littell
ATTORNEYS

April 6, 1937. J. KARMAZIN Re. 20,321

METHOD OF MAKING HEAT RADIATORS

Original Filed May 31, 1929 2 Sheets-Sheet 2

INVENTOR
JOHN KARMAZIN
BY Hammond & Littell
ATTORNEYS

Reissued Apr. 6, 1937 Re. 20,321

UNITED STATES PATENT OFFICE 20,321

METHOD OF MAKING HEAT RADIATORS

John Karmazin, Huntington, Ind., assignor to Karmazin Engineering Company, Detroit, Mich., a corporation of Michigan Original No. 1,997,563, dated April 9, 1935, Serial No. 367,308, May 31, 1929. Application for reissue August 24, 1936, Serial No. 97,660

5 Claims. (Cl. 113—118)

This invention relates to improvements in heat radiators; and more especially to heat radiators for lowering the temperature of the cooling liquid in the engines of automobiles and other motor vehicles.

An object of the invention is to provide a radiator comprising relatively few parts designed to afford a very efficient cooling action, and be quite simple in construction, so that it can be easily and readily made and at low cost.

Another object of the invention is to provide an improved method by which the parts of the radiator or tube can be easily, quickly and inexpensively assembled and permanently attached to one another in a manner that will permit the circulation of the cooling liquid of the engine therethrough without risk of leakage.

The radiator of this invention as shown and described is of the fin-and-tube type which is made of separate elements properly assembled, each element consisting of a strip or fin of metal to form loops or one or more tubular projections formed therefrom, the ends of the projections being open; and the elements being united by nesting them together with the projections of one element telescoping into the projections of the adjacent element or fin. The telescoping projections thus form one or more continuous tubes through which the liquid can circulate and the temperature thereof is lowered by the air coming in contact with the outside of the tubes and integral fins and carrying away heat.

Heretofore, it has been more or less difficult to make the joints between the telescoping projections leakproof; and, though soldering has been employed, the task of getting the solder into place and making it seal the joints between the telescoping projections has been somewhat unsatisfactory; being either expensive or requiring a relatively great amount of time for the performance of the soldering operation. My invention aims to eliminate previous objections on this score by a method which enables the joints between the telescoping projections to be soldered together in a most effective manner, to receive the solder at the proper points and to complete the whole operation in a relatively short period and with the use of a small amount of solder. This end can be gained, for example, by putting a thin strip of solder into each tube made up of a row of telescoping projections, after the projections have, of course, been suitably cleaned with acid or any other suitable substance, and then placing the core in an oven and supporting the assembled radiator body in such position as will enable the solder as it is melted to fill all the joints between the projections, entirely around the circumference of each of the tubes through which the liquid is to flow.

With the above and other objects in view, the invention consists in the novel features, combination of parts and mode of proceeding, hereinafter set forth and illustrated, and defined in the claims hereof.

The drawings show one or more forms by which the invention can be practiced, but I may obviously resort to changes in detail without departing from the principle or exceeding the scope of the invention.

Figure 1:
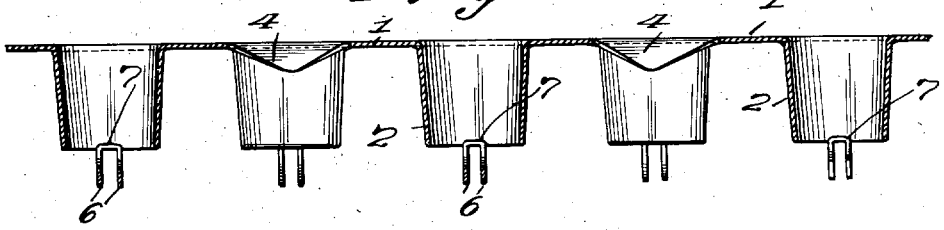
Fig. 1 is a view partly in section showing in side elevation an element consisting of a plate or strip of metal with projections formed therefrom, to be employed in building a radiator according to this invention.
Figure 2:
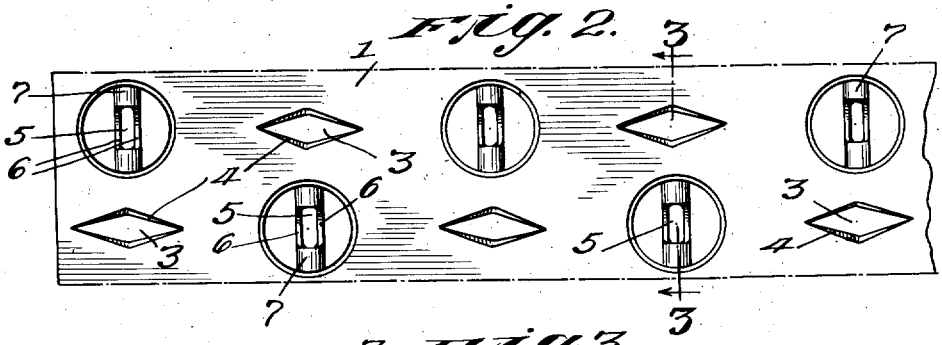
Fig. 2 is a top plan thereof.
Figure 3:
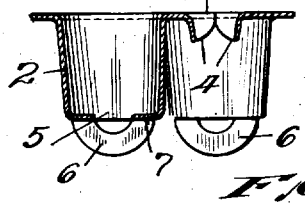
Fig. 3 is a section taken transversely through Fig. 2 on the line 3—3 thereof.

The numeral 1 indicates a strip or plate of metal which is stamped to provide tubular projections 2 which will taper somewhat toward their outer ends. The strip 1 may also have openings 3, the edges of which are bent downward, as shown at 4. The projections 2 are arranged in rows along the length of the strip, the rows, of course, being staggered so that the projections 2 of each row are located between the intervening spaces of each adjacent row, and the openings 3 may be likewise arranged and are formed in the spaces between the projections 2 of the successive rows so that the openings 3 and projections 2 alternate transversely of the strip 1 at any given point. Of course as many rows of projections 2 may be formed as desired. The strip in Fig. 1 shows from end to end two rows of projections and two rows of openings, the projections 2 and openings 3 being staggered, as above set forth. The edges 4 of the openings 3 extend lengthwise of the strip.

Figure 5:
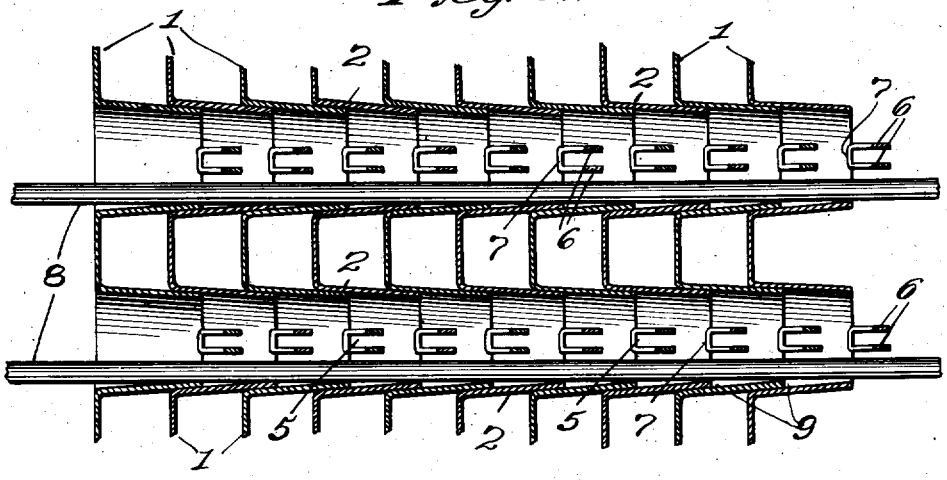
Fig. 5 is a view similar to Fig. 4 showing the first step in the process of soldering the joints between the tubular projections.
Figure 6:
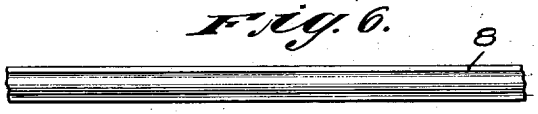
Fig. 6 shows in side view and Fig. 7 in end view a strip of solder employed in the soldering process.

If desired, the openings 3 and down-turned projections 4 may be omitted as indicated in Fig. 5.

The outer ends of each projection 2 are punched out in the middle, as shown at 5, leaving each projection with an inturned rim or flange 6 at its outer end. These flanges are cut along the lines which unite them to the projections 2 except at diametrically opposite points, and forced outward to form semi-circular vanes or wings 8; the portions of the rims which remain attached to the projections 2 being indicated at 7. These portions project at diametrically opposite points in the outer end of each projection and serve to some extent to obstruct the free flow of water therethrough to prevent the water from passing too rapidly, as well as to connect the vanes 8 to the projections 2.

Figure 4:
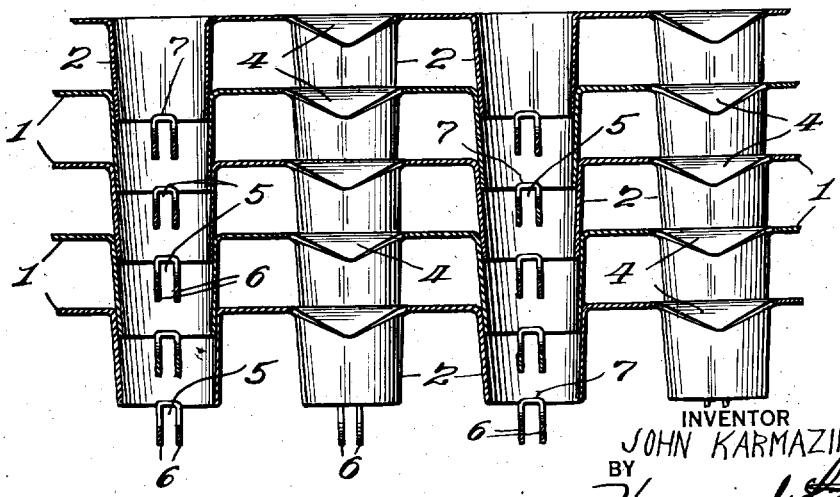
Fig. 4 shows how the elements or units are nested to form the body of the radiator.

When the elements or units are assembled as in Fig. 4, they form the body or core of the radiator; the tubes for the cooling liquid being made up of the telescopic projections, which will be spaced apart far enough to allow free circulation of air among the tubes and through the core. Usually the tubes will be vertical and the fins 1 horizontal when the radiator is in use. The vanes 8 with the parts 7 which join these vanes to the projections will deflect the water somewhat from the middle of the tubes towards the circumference, as well as slightly retard the water and prevent it from flowing through the tubes too fast. Some of the heat of the water is also taken up by the vanes 8 and conducted directly to the projections 2 and plates 1, and the water in the tubes is efficiently cooled by the action of the air which flows against the tubes and along the surface of the plates 1 and strikes the projections 4. These projections 4 serve to retard the air somewhat to prevent it flowing too rapidly through the radiator and may also, to some extent, deflect the air and cause it to pass through the plates. The air thus extracts the maximum of heat through the sides of the projections 2 and plates 1 and the cooling action of the radiator is very efficient.

Figure 7:
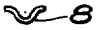
Figure 10:
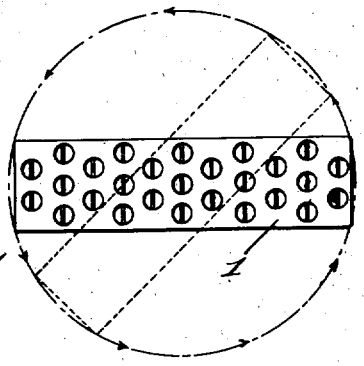
Fig. 10 shows how the solder is caused to flow into contact with all points in the circumference of the tubes at the joints between the telescoping projections.

To provide a tight joint between the various projections 2, the radiator, when built up of as many units as are required to make the liquid tubes of the necessary length, is put in horizontal position as indicated in Figs. 5 and 10. A strip of solder 8 is passed through each row of projections 2. This strip of solder should be thin so as to use no more material than is necessary, and it is preferably made channel-shaped as shown in Fig. 7 to give it stiffness so that it can be handled and will not readily bend. All of the projections 2 are previously cleaned with acid or any other suitable agent, preferably before the projections 2 are telescoped together. The radiator is then put into an oven and heated to melt the strips of solder 8. As soon as the solder melts, it of course collects at the lowest points 9 in the tubes made up by the projections 2; and as the tubes are conical, the solder in each projection will naturally run down towards the telescoped end of the projection received therein. This is due to the fact that, because of the conical shape of each projection 2, the bottom of each projection will slope downward towards the telescoped end of the adjacent projection, when the radiator is in horizontal position, forming in effect a depression as shown at 9 in Fig. 5.

Figure 8:
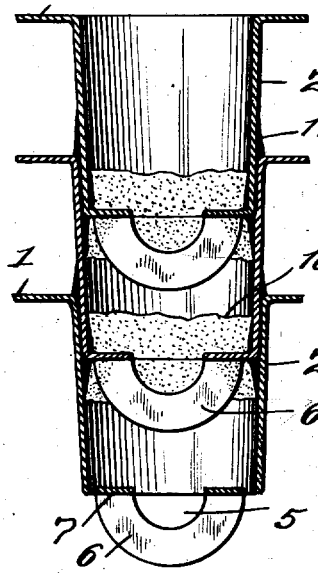
Fig. 8 shows the manner in which the solder or like jointing material takes effect on the interior of each set of tubular projections forming a tube.
Figure 9:
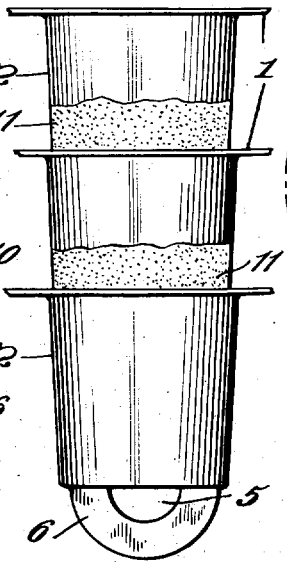
Fig. 9 shows how the solder takes effect on the outside thereof.

As the solder 8 is melted, the radiator in the oven is rotated about an axis as indicated in Fig. 10. The solder now flows round on the inside of each projection adjacent the depression 9 which telescopes therein. It penetrates in between the two projections probably by capillary attraction and appears on the outside of the tubes as well as the inside, forming a coating which closes the joint between the adjacent projections perfectly using a minimum amount of solder. This coating is indicated at 10 in Fig. 8 on the inside of the projections, and at 11 in Figs. 8 and 9 on the outside thereof. The inside coating covers the ends of the telescoped projection and the adjacent inside surface of the projection which receives it; while the outside coating 11 fills the corner between the fins 1 and the projections passing into the fins, and a small portion of the surface of the projection which passes into each of the fins 1. The joint between each pair of projections is thus fully sealed at two points and any possibility of leakage is entirely obviated. The radiator is thus not only simple in construction and easy and inexpensive to manufacture and finish, but it is also very effective in action, and the soldering of the joints is easily and expeditiously accomplished. The soldering takes effect at each joint so completely that all leakage and subsequent deterioration and opening of the joints is rendered impossible.

It will be seen that any one tube of applicant's structure comprises, in effect a series of aligned loops which form transversely disposed ridges for distributing the bonding material.

What I claim as my invention is:

1. The method of forming a radiator of the fin-and-tube type having a plurality of tubes, each formed of telescoping projections with substantially cylindrical joints between each pair of projections, which consists in inserting a strip of solder into each tube of telescoping projections, disposing the radiator so that each of said tubes is in horizontal position, and then subjecting the radiator to heat to melt the solder, and changing the position of the radiator through an angle of 360° while maintaining the tubes horizontal to cause the solder to flow into each joint throughout the whole length of the joint.

2. The method of forming a radiator of the fin-and-tube type having tapering telescoping projections constituting continuous tubes and making said tubes liquid tight which consists in putting the radiator with the tubes in horizontal position, placing a strip of jointing material in each tube, subjecting the radiator to heat to melt the material to allow said material to flow down to the lowest point of each projection against the end of the projection telescoped therein and to flow between said projections by capillary attraction while keeping the tubes horizontal, whereby said jointing material adheres to the inner face of the one projection and the adjacent outer face of the projection telescoped therein at the end of the latter and also passes between said projections to the outside thereof, and closes the seams between the fin and the telescoped projections.

3. The method of soldering the condenser radiator of an integral fin-and-tube type in which tubular projections are telescoped together to form a continuous tube which comprises inserting a relatively thin, long strip of solder in the tubes and heating the tubes to cause the solder to flow through the telescoped portions of the projections from the inside to the outside of the tubes while retaining the radiator in horizontal position and slowly rotating the same through one revolution, said flow of solder substantially withdrawing all solder from the tube walls between joints.

4. The method of manufacturing tubing which comprises aligning loops of metal to form a tube having transversely disposed joints with internal transversely disposed ridges, inserting bonding material in strip form through substantially all of the loops to be joined in said tube, and passing said tube through a heating zone whereby said bonding material melts and gathers adjacent said ridges and said joints.

5. The method of manufacturing tubing which comprises aligning loops of metallic material so as to form a tube having internal ridges, inserting a wire of bonding material through substantially all of the loops to be joined in said tube and passing said tube through a heating zone.

JOHN KARMAZIN.